United States Patent
Wood, Jr.

(10) Patent No.: US 9,322,487 B2
(45) Date of Patent: *Apr. 26, 2016

(54) NUCLEAR GRADE AIR ACCUMULATION, INDICATION AND VENTING DEVICE

(71) Applicant: Nuccorp, Inc., Lexington, SC (US)

(72) Inventor: Willie Turner Wood, Jr., Lexington, SC (US)

(73) Assignee: Nuccorp, Inc., Lexington, SC (US)

( * ) Notice: Subject to any disclaimer, the term of this patent is extended or adjusted under 35 U.S.C. 154(b) by 39 days.

This patent is subject to a terminal disclaimer.

(21) Appl. No.: 14/358,941

(22) PCT Filed: Nov. 16, 2012

(86) PCT No.: PCT/US2012/065719
§ 371 (c)(1),
(2) Date: May 16, 2014

(87) PCT Pub. No.: WO2013/075056
PCT Pub. Date: May 23, 2013

(65) Prior Publication Data
US 2014/0311588 A1    Oct. 23, 2014

Related U.S. Application Data

(60) Provisional application No. 61/560,360, filed on Nov. 16, 2011.

(51) Int. Cl.
*F16K 24/04*    (2006.01)
*G21C 17/022*   (2006.01)
(Continued)

(52) U.S. Cl.
CPC ............... *F16K 24/044* (2013.01); *F16K 37/00* (2013.01); *G21C 17/022* (2013.01); *G21C 19/28* (2013.01);
(Continued)

(58) Field of Classification Search
CPC ........ G21C 17/022; G21C 19/28; G21D 1/00; F16K 37/00; F16K 24/044; Y10T 137/3099; Y10T 137/8342; Y02E 30/40
USPC ..................... 137/202, 558; 73/309
See application file for complete search history.

(56) References Cited

U.S. PATENT DOCUMENTS 2,627,868 A * 2/1953 Runnels .................. B60T 11/30
                                                                    137/198
3,152,604 A * 10/1964 Frye ....................... F16K 24/042
                                                                    137/202

(Continued)

OTHER PUBLICATIONS

Blaine R. Copenheaver, International Search Report of PCT/US2012/065719 dated Feb. 7, 2013.

*Primary Examiner* — Lisa Caputo
*Assistant Examiner* — Philip Cotey
(74) *Attorney, Agent, or Firm* — Michael A. Mann; Nexsen Pruet, LLC (57) ABSTRACT

A device for accumulating, isolating, indicating and venting accumulated gas in a fluid system pipe includes a main pipe fitting affixed to a system pipe in which a hole has been drilled. A standpipe attached to the pipe fitting houses a magnetic float. A magnetic-float level indicator exterior to the pipe indicates the magnetic float's level. A valve attached to the standpipe above the magnetic float allows controlled ventilation of the gas in the standpipe and thus in the piping system. Gas from the system pipe accumulates in the standpipe, removed from the primary fluid flow path of the system pipe. In the standpipe, as the liquid/gas interface drops, the float drops to a pre-determined level, at which point the user vents the gas from the piping system, causing the magnetic float to rise indicating that gas is again at acceptable levels in the piping system.

17 Claims, 7 Drawing Sheets

(51) Int. Cl.
*G21C 19/28* (2006.01)
*F16K 37/00* (2006.01)
*G21D 1/02* (2006.01)

(52) U.S. Cl.
CPC . *G21D 1/02* (2013.01); *Y02E 30/40* (2013.01); *Y10T 137/3099* (2015.04); *Y10T 137/8342* (2015.04)

(56) References Cited

U.S. PATENT DOCUMENTS

| | | | | |
|---|---|---|---|---|
| 3,168,103 A * | 2/1965 | Kochaver | ............ | F16K 24/048 137/202 |
| 3,367,362 A * | 2/1968 | Hoffman | ............ | F16K 1/14 137/515.5 |
| 4,275,382 A * | 6/1981 | Jannotta | ............ | G01F 23/18 137/386 |
| 4,694,693 A * | 9/1987 | Gerlowski | ............ | G21C 15/18 376/207 |
| 5,028,910 A * | 7/1991 | Meacham | ............ | D06F 39/081 137/558 |
| 5,450,881 A * | 9/1995 | Patterson | ............ | A01M 7/0092 137/202 |
| 5,655,568 A * | 8/1997 | Bhargava | ............ | G05D 7/0146 137/557 |
| 7,380,542 B1 * | 6/2008 | Herrington | ............ | F02M 37/0088 123/509 |
| 8,505,568 B2 * | 8/2013 | Wood, Jr. | ............ | F16K 24/046 137/202 |
| 2006/0029179 A1 * | 2/2006 | Srinivasan | ............ | G21D 3/12 376/211 |
| 2006/0196261 A1 * | 9/2006 | Reinis | ............ | G01F 23/0023 73/290 R |
| 2007/0227593 A1 * | 10/2007 | Belford | ............ | A01G 25/02 137/202 |
| 2011/0120577 A1 * | 5/2011 | Wood, Jr. | ............ | F16K 24/046 137/558 |
| 2011/0138907 A1 * | 6/2011 | Rudd | ............ | G01F 23/74 73/313 |

* cited by examiner

NUCLEAR GRADE AIR ACCUMULATION, INDICATION AND VENTING DEVICE

CROSS-REFERENCE TO RELATED APPLICATION

The present application claims priority to pending U.S. Provisional Patent Application No. 61/560,360, filed Nov. 16, 2011 and incorporated herein by reference.

BACKGROUND OF THE INVENTION

The present invention relates generally to the operation of fluid piping systems. More particularly, the present invention relates to keeping fluid piping systems free of air and other gases.

Since the advent of commercial nuclear power in the late 1960's, the industry has been aware of issues regarding the accumulation of air and other gases in the high points in various safety-related fluid systems. These systems are designed to prevent nuclear fuel damage given various postulated accident scenarios. Air and gas accumulation in these fluid systems could result in failure of those systems and in their failure in turn to prevent fuel damage.

The operators of nuclear power plants are required to demonstrate that they have suitable design, operational, and testing control measures in place for complying with regulations that require, by federal law, these fluid systems to be "full", i.e. devoid of air and/or gases.

Currently in the nuclear industry, the common ways to detect unwanted air in piping systems is to perform ultrasonic test (UT) examinations at locations where no current vent exists or use existing vents to periodically vent suspect locations without knowing whether air has accumulated in those locations of the system. These solutions are unsatisfactory because they require radiation exposure of workers when there may be no need for testing or venting. Also, UT probes, in general, cannot remain connected to the piping system in question due the temperature limitations of the UT equipment and associated coupling material. As a consequence, they must be reconnected each time a UT examination is to be performed, thus taking additional time and resulting in additional exposure to radiation.

Currently, outside of the nuclear industry, there are a number of solutions for measuring gas accumulation in piping, for indicating the extent of the gas accumulation, and for venting the accumulated gas. However, these solutions use materials and construction practices that fail to meet the needs of the highly specialized requirements of the commercial nuclear industry, particularly if a device is to penetrate the pressure boundary of fluid piping systems.

SUMMARY OF THE INVENTION

The present invention is a device that indicates whether otherwise liquid-filled systems have trapped gas, that removes the gas from the primary fluid flow path, that indicates how much gas is trapped, and that allows for the venting of the gas.

BRIEF DESCRIPTION OF THE DRAWINGS

In the figures

DETAILED DESCRIPTION OF PREFERRED EMBODIMENTS

The present invention is directed to a gas accumulating, isolating, indicating and venting device, generally indicated by reference number 10 for use in a piping system. A system pipe 12 is shown in phantom lines in FIGS. 1 and 1B and is not part of the present invention but device 10 is intended to be used with system pipe 12.

For simplicity, the word gas will be used to indicate gas or gases.

Figure 1:
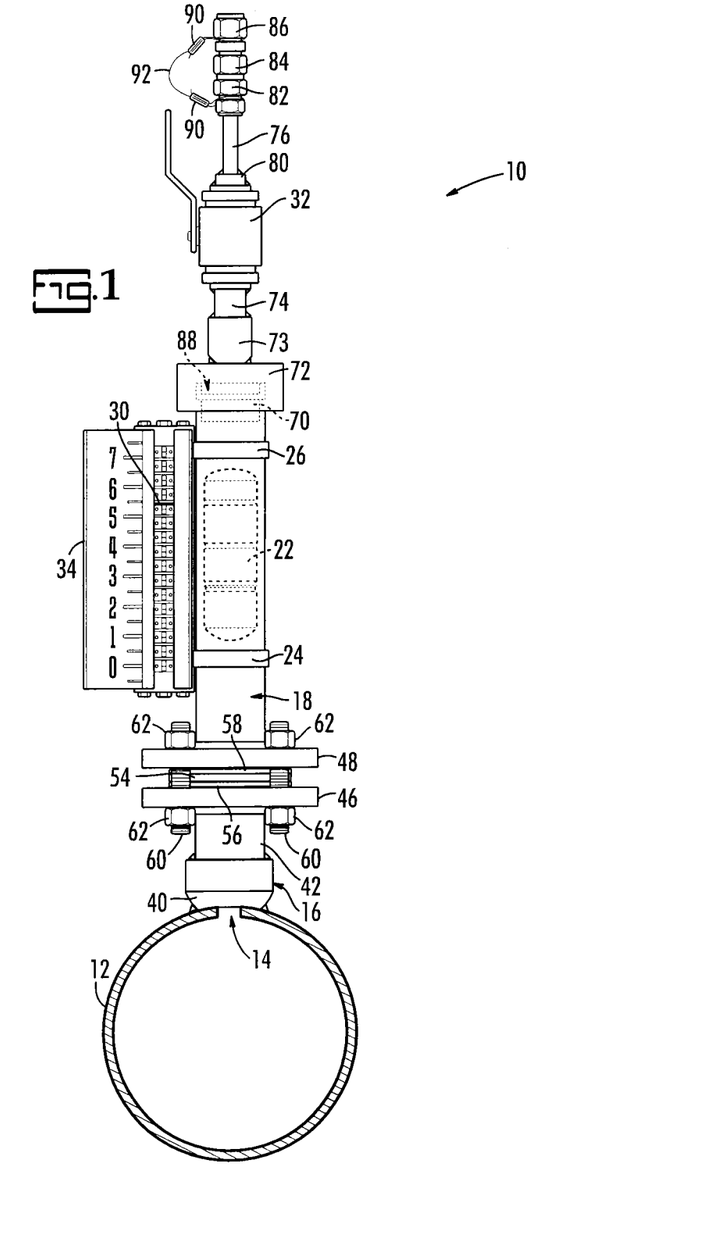
FIG. 1 is an elevation view of the air accumulating, isolating, indicating and venting device according to an embodiment of the present invention.

Referring now to FIG. 1, device 10 includes a pipe fitting 16 that secures device 10 to system pipe 12, a standpipe 18 attachable to pipe fitting 16, a magnetic float 22 freely movable in vertically-oriented standpipe 18, and a corresponding indicator 30 external to standpipe 18 but which moves vertically with magnetic float 22 inside standpipe 18 as the level of fluid in standpipe 18 changes and responsively indicates that level by the position of indicator 30 on scale 34. Scale 34 carries a sequence of numbers. Indicator 30 may thus indicate the level of fluid in standpipe 18 by the correspondence of its position on scale 30 relative to that sequence of numbers. A vent valve 32 is carried above standpipe 18 for venting gas that has accumulated in system pipe 12.

To connect the present device to a fluid system pipe, a hole 14 is drilled into the system pipe 12 at its highest, local elevation in the system piping, where gas would tend to accumulate. The highest local elevation is any point in the length of the piping where the piping on either side thereof is at a lower elevation. There may be several locally highest local elevations where gases may accumulate, and the present device may be installed at each one.

A pipe fitting 16 is firmly affixed to system pipe 12 over hole 14. Pipe fitting 16 includes a number of components to connect system pipe 12 to standpipe 18. In particular, pipe fitting includes a soc-o-let 40 welded directly to system pipe 12 over hole 14. Soc-o-let 40 allows system pipe 12 to be connected to a pipe stub 42 so that the interior of system pipe 12 is in fluid communication with device 10 through hole 14. Pipe stub 42 terminates in a lower flange 46, and standpipe 18 terminates at its lower end in an upper flange 48 that corresponds to lower flange 46.

Figure 2:
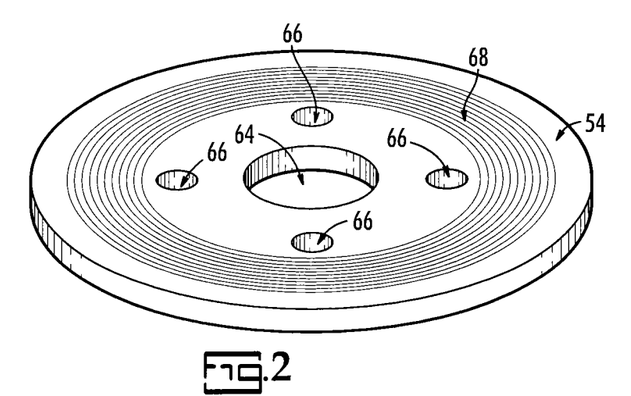
FIG. 2 is a perspective view of the float retaining orifice of FIG. 1, according to an embodiment of the present invention.

Between lower flange 46 and upper flange 48 is a float retaining orifice 54, best seen in FIG. 2, between a lower gasket 56 and an upper gasket 58. Lower and upper flanges 46, 48, are secured together releasibly with float retaining orifice 54 and lower gasket 56 and upper gasket 58 using plural studs 60 and nuts 62 or other secure fasteners that permit release but also provide sufficient known holding power to provide a margin of safety and assurance to those operating the plant that the present device is not likely to fail. These components are part of pipe fitting 16 and enable system pipe 12 to be in communication with standpipe 18 securely and safely.

Float retaining orifice 54, as illustrated in FIG. 2 is disk-shaped with one central flow hole 64, four smaller flow holes 66 and annular grooves 68. Float retaining orifice 54 is the same on its opposing faces. Holes 64 and 66 allow fluid and gas to pass between system pipe 12 and device 10. Lower and upper gaskets 56, 58 are made of a material that compresses slightly but provides a suitable seal against the expected internal pressures to which it is subjected, and may be made of a material such as a graphite and stainless steel combination. Grooves 68 may be cut any pattern into float retaining orifice 54 such as concentric rings or a single spiral, and are intended to provide a better seal when gaskets 56, 58 are pressed against the lower and upper faces of retaining orifice 54.

Standpipe 18 houses magnetic float 22 together with fluid and gas from system pipe 12. Magnetic float 22 has a smaller diameter than the inner diameter of standpipe 18 so that as gas enters standpipe 18 it passes around magnetic float 22 and allows magnetic float 22 to descend within standpipe 18. Accordingly, magnetic float 22 moves easily over its range in standpipe 18. If gas is present in standpipe 18, opening vent valve 32 expels gas resulting in a rise in the fluid level in standpipe 18 and with the rising fluid level, magnetic float 22 also rises. Magnetic float 22 rises from float retaining orifice 54 at the lower end of its travel to an upper float stop 70, best seen in FIG. 3, at the top end of its travel. Upper float stop 70 has four flow holes 78 that allow fluid and gas to flow around magnetic float 22. When at the bottom of standpipe 18, the bottom of magnetic float 22 is cradled by central flow hole 64, leaving holes 66 to pass fluids and gas around magnetic float 22.

Scale 34 is affixed externally to standpipe 18 using an upper and a lower band clamp 24, 26.

Figure 3:
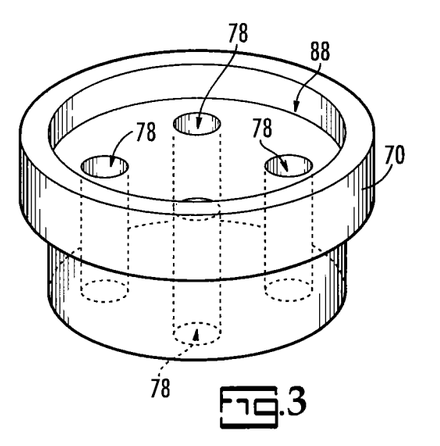
FIG. 3 is a perspective view of the upper float stop shown in FIGS. 1, according to an embodiment of the present invention.

Upper float stop 70 may have a spacing rim with a counterbore 88 on its upper surface, as best seen in FIG. 3, to provide a standoff from pipe cap 72 so that the flow of fluid or gas though flow holes 78 is not blocked by pipe cap 70 when magnetic float 22 is in its uppermost position in standpipe 18. Standpipe 18 terminates in a pipe cap 72 which communicates with vent valve 32 via a half coupling 73 and a short length of exit pipe 74. Pipe cap 72 has a bore hole formed therein so that gas in standpipe 18 can be vented through flow holes 78 in upper float stop 70 and pipe cap 72. Vented gas from vent valve 32 flows through a pipe-to-tube transition coupler 80 to a tube 76.

Tube 76 thus communicates with the interior of standpipe 18 through vent valve 32, exit pipe 74, pipe cap 72 and upper float stop 70 so that gas entering standpipe 18 can be vented from standpipe 18 through tube 76 by the opening of vent valve 32. Vent valve 32 is firmly connected to the tube 76 via pipe-to-tube transition coupler 80, again preferably by welding.

Tube 76 terminates in a quick-disconnect fitting including a quick-disconnect body 82 with quick-disconnect stem 84 with tube plug 86 secured to quick-disconnect body 82 by lanyard clips 90 and lanyard wire 92.

When system pipe 12 is filled with fluid, fluid will flow through hole 14 into standpipe 18 via pipe fitting 16. If standpipe 18 is full of fluid, magnetic float 22 will rise to the upper limit within standpipe 18 until magnetic float 22 presses against the underside of upper float stop 70. Magnetic float 22 will indicate by the position of indicator 30 on scale 34 the amount of gas that is in standpipe 18. If gas enters system pipe 12, that gas will rise in system pipe 12 through hole 14 and flow through pipe fitting 16 into standpipe 18 and around magnetic float 22 displacing fluid in standpipe 18. The boundary between fluid and gas in standpipe 18 will fall as a result of more gas and less fluid in standpipe 18. Accordingly, magnetic float 22 will fall and again indicate by the relative position of indicator 30 with respect to scale 34 the presence of air in the system pipe. An operator may note the decline of indicator 30 on scale 34 and, if the decline is sufficient, that is, at or below a pre-designated level, will be able to vent standpipe 18 through valve 32 and tube 76. As the unwanted gas is vented through valve 32, magnetic float 22 will rise again to its maximum position, indicating by the position of indicator 30 with respect to scale 34 that gas is no longer present in standpipe 18.

The present invention may also or alternatively have one or more of the following: (1) a remote electronic level indicator (not shown) that could provide remote level indication; (2) an automatically-controlled vent valve to expel unwanted gas based on indication of level in the standpipe.

Figure 4:
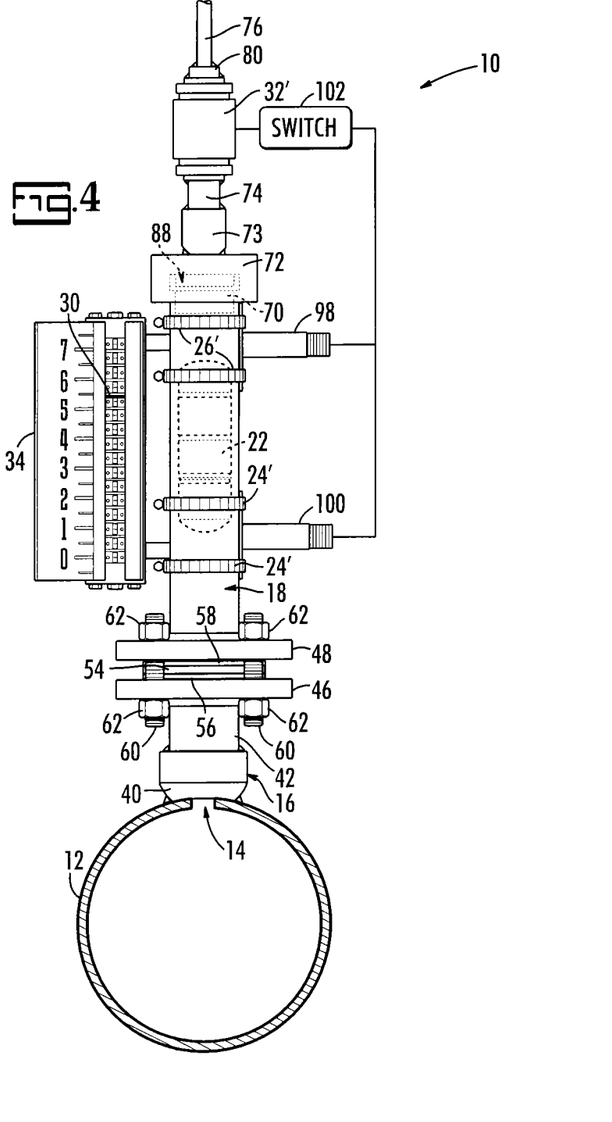
FIG. 4 is an elevation view of the air accumulating, isolating, indicating and venting device according to an alternative embodiment of the present invention.

FIG. 4 depicts an elevation view of an alternate embodiment of the present invention similar to that shown in FIG. 1 except for externally mounted high and low level switches 98, 100, respectively, connected electrically to an electronic control switch 102 operating vent valve 32'. High and Low level switches 98, 100, are secured using clamps 24' and 26', respectively (as well as scale 34 with float level indicator 30). All other components shown in FIG. 4 are the same as in FIG. 1 and use the same reference numbers to so indicate. Vent valve 32' vents automatically to a gas collector (not shown).

Figure 5:
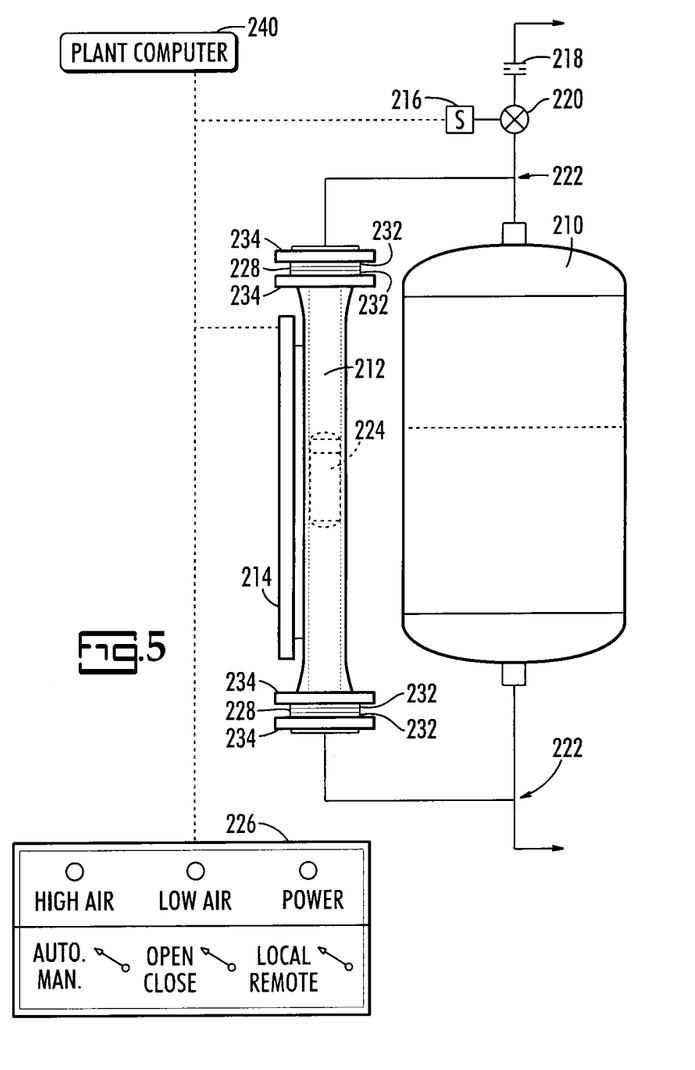
FIG. 5 is an schematic view of an air accumulating, isolating indicating and venting system, with pressure chamber next to a collection chamber, according to still another alternative embodiment of the present invention.
Figure 6:
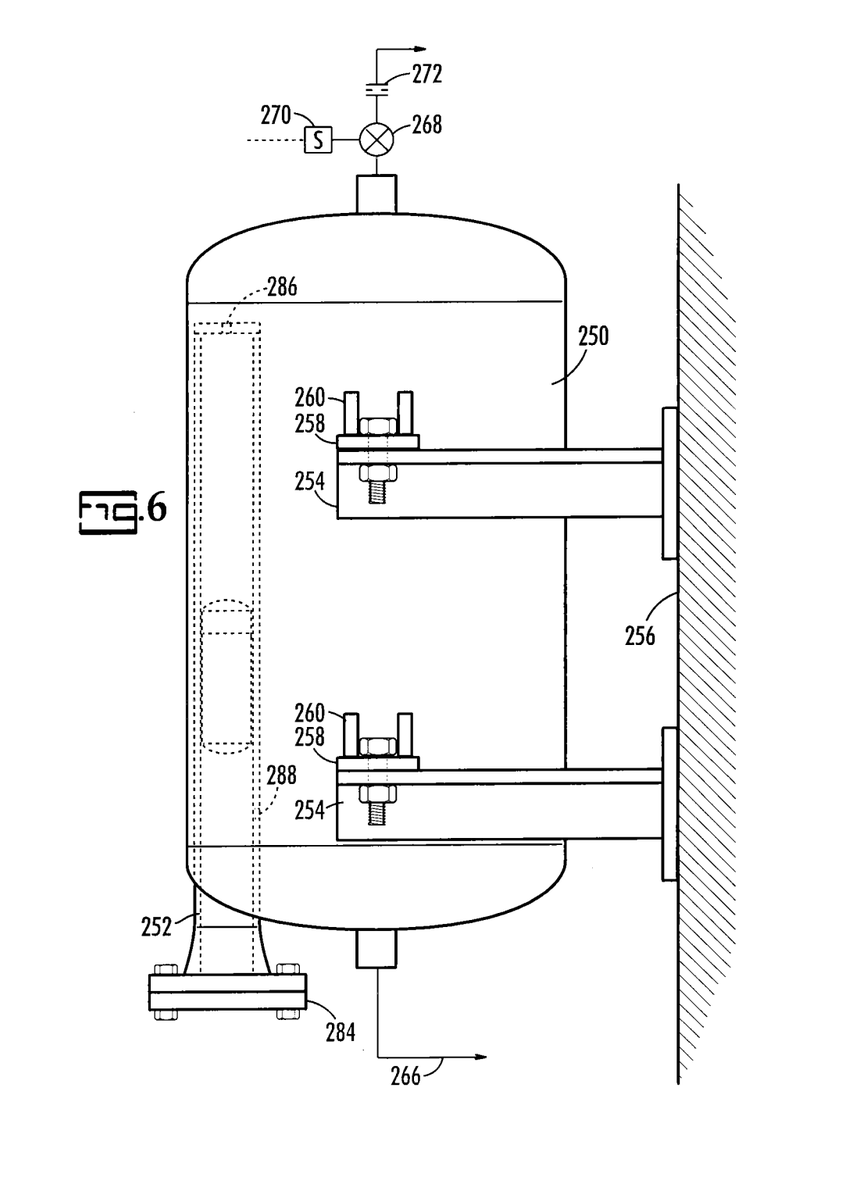
FIG. 6 is a front elevation view of an air accumulating, isolating indicating and venting system with an pressure chamber inside the collection chamber, according to still another alternative embodiment of the present invention.

FIGS. 5 and 6 illustrate alternate embodiments of the present nuclear grade air trap. In both of these embodiments, there is a pressure chamber and a collection chamber.

In the first of the two embodiments, seen in FIG. 5, a pressure chamber 212 is placed in parallel with a collection chamber 210, both above the high point in the system so that air in the system will rise into pressure chamber 212 and collection chamber 210. Air from pressure chamber 212 and collection chamber 210 can be vented at the direction of plant operators via an electric solenoid control 216 operating a valve 220 through a precision venting orifice 218. The design of collection chamber 210 is similar to device 10 described above except that pressure chamber 212 may be a non-welded design, preferably a forging with its various holes and slots formed with a hole driller or long end mill. However, as described above, its float 224 may be a magnetic float and its float sensor 214, a magno-restrictive transducer.

Pressure chamber 212 has a pair of flanges 234 at each end sandwiching a float retaining orifice 228 between gaskets 232. Electric solenoid control 216 and float sensor 214 are tied to the plant computer 240 which activates a display 226 showing the status of the system. A light or other signal confirms power and either low air or high air and whether the system is on automatic or manual control, is open or closed, and is local or remote. Alternatively, float sensor 214 can be a manual sensor with a scale carrying a sequence of numbers and an indicator indicating the level of fluid corresponding to one of those numbers similar to that shown in FIG. 4

In the embodiment of FIG. 5, a goal of the device is to enable substantially more air to be collected without undue impact on the plant seismic analysis. Collection chamber 210 may be mounted to a wall. It and pressure chamber 212 are connected to each other and to system piping using code-class piping or flexible hose to the local high point through TEE connectors 222, so that air can be accumulated, isolated, measured and vented by a system isolated so it has its own seismic signature.

Figure 7:
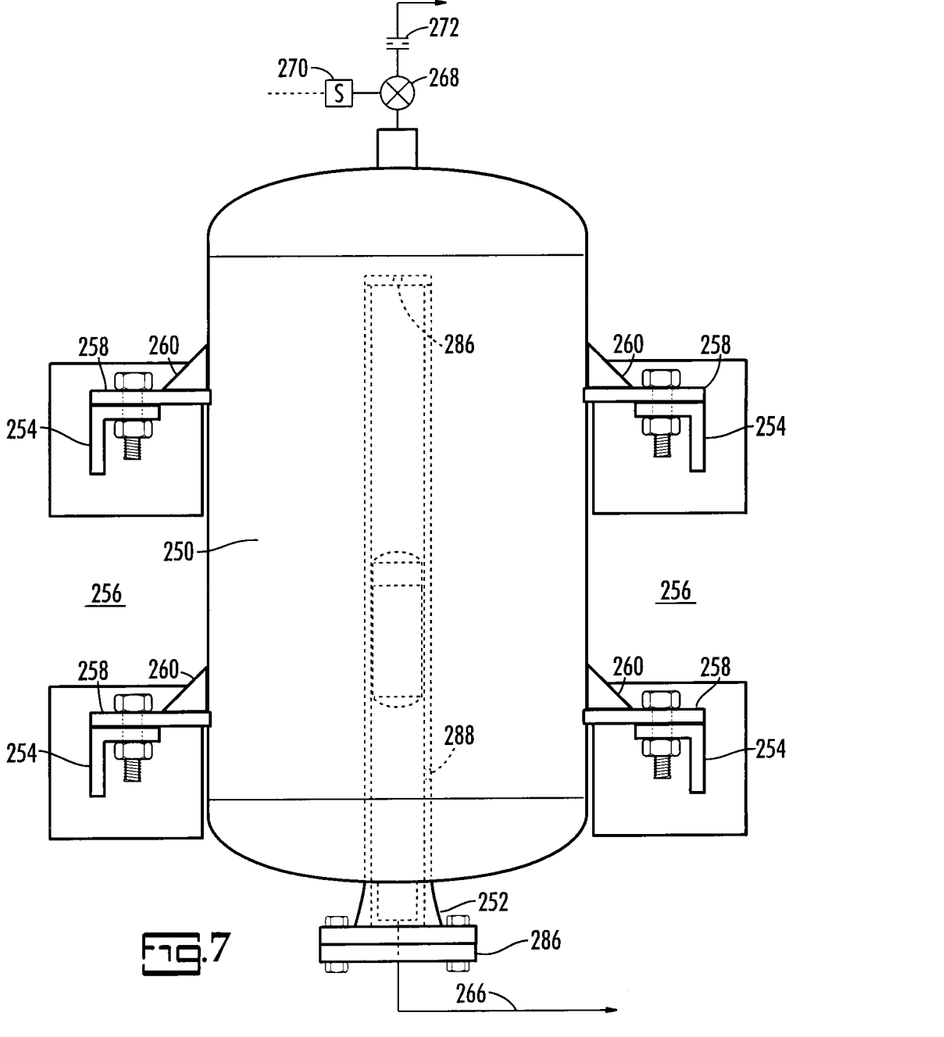
FIG. 7 is a side elevation view of the air accumulating, isolating indicating and venting system of FIG. 6, according to the alternate embodiment of the present invention.

A variation on the alternate system of FIG. 5 is shown in FIGS. 6 and 7, which are front and side views of the collection chamber 250 with the float guide 252 mounted inside collection chamber 250. Brackets 254 are attached to opposing walls 256 to support horizontal plates 258 attached to the sides of collection chamber 250, using a pair of gussets 260 connecting each horizontal plate 256 to collection chamber 250 for added stiffness.

Air from the line 266 enters collection chamber 250, and is vented through valve 268 controlled by electric solenoid controller 270 through precision venting orifice 272. Fluids entering collection chamber 250 will also enter float guide 253 through holes 286 and 288 or other openings that assure complete fluid communication between collection chamber 250 and float guide 253. Float guide 252 is closed to the exterior, preferably by a blind flange 286 bolted to the end thereof, which can be removed to allow inspection or replacement of the float.

Figures 8, 9, 10, 11:
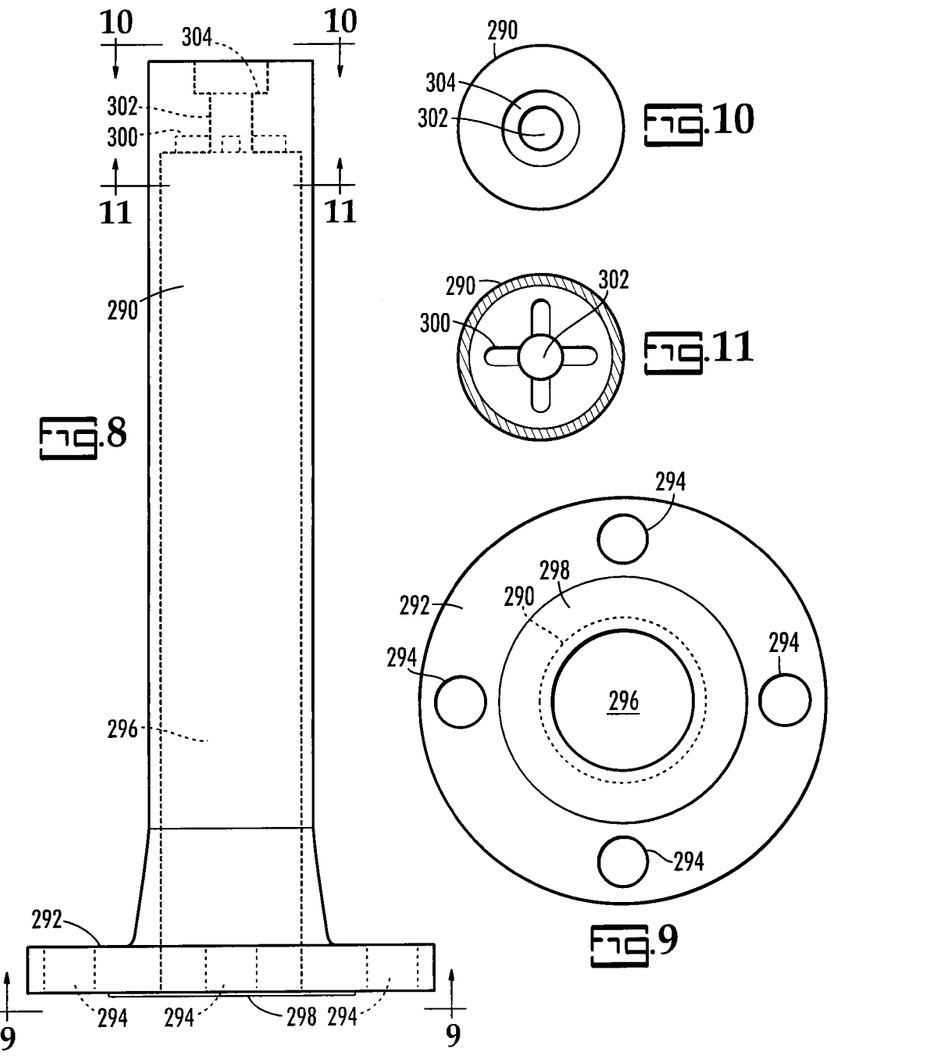
FIG. 8 is a side view of the pressure chamber of FIG. 6, according to the alternate embodiment of the present invention.
FIG. 9 is a bottom view of the pressure chamber of FIG. 8 taken along lines 9-9 of FIG. 8, according to the alternate embodiment of the present invention.
FIG. 10 is a top view of the pressure chamber of FIG. 8 taken along lines 10-10 of FIG. 8, according to the alternate embodiment of the present invention.
FIG. 11 is a cross-sectional view of the pressure chamber of FIG. 6 taken along lines 11-11 of FIG. 8, according to the alternate embodiment of the present invention.

FIGS. 8-11 illustrate the details of a standpipe. Standpipe 290 is a forging having a base 292 which is preferably annular and includes four bolt holes 294 formed therein and a central, axial bore hole 296, as best seen in FIG. 9. Central bore hole 294 steps radially outward at 298. Likewise, from the top (best seen in FIG. 10). Just below the top of standpipe 290, along lines 11-11 of FIG. 8 as seen in FIG. 11, a cruciform-shaped recess 300 is formed in the top of standpipe 290 where central bore hole 294 steps radially inward to form a bottle neck 302 before stepping radially outward at an exit 304 from standpipe 290.

As the fluid/gas interfaces drops below the lower level, as detected by low level sensor 100, sensor 100 sends a signal to electronic control switch 102 causing it to open vent valve 32' and thereby vent accumulated gas. Magnetic float 22 thus rises with the rise in the fluid gas interface, until it reaches high level sensor 98. Sensor 98 sends a signal to electronic control 102 to close vent valve 32', thereby halting the venting of gas.

The present invention has a number of advantages. First, it provides an integrated solution to issues surrounding the accumulation of unwanted gases in safety-related piping system, particularly in the nuclear industry where these requirements are stringent. It provides a way to monitor the amounts of accumulated gas that improves productivity, avoids unnecessary venting, facilitates timely venting, and, in the nuclear industry, reduces personnel radiation exposure. It also provides the ability to monitor amounts of accumulated gas in piping systems in locations that can be in difficult environments, such as, at high temperatures. In addition, it can provide constant verification that the piping systems are "full", which provides a nuclear licensee with the ability to prove literal compliance with regulatory requirements and for quality assurance purposes generally. The present invention provides the ability to track levels of air-gas accumulation over time. Finally, as air-gas is accumulated in the device, it provides the ability to preselect acceptable levels isolated of air-gas accumulation prior to venting being required for that particular system.

The present invention is unique in that it is different from other known processes or solutions. More specifically, the present invention owes its uniqueness to the fact that it: (1) provides constant indication of accumulation of gases in otherwise liquid-filled systems, which is especially important for proving literal compliance that said piping systems are "full" in the nuclear power industry; (2) continuously removes and isolates air-gas from the fluid flow path of the system pipe; (3) allows for customization of structural dimensions to ensure the proper minimum, allowed water level can be defined to meet nuclear regulatory requirements; (4) can be constructed and installed to specific nuclear codes and standards by the licensee's internal safety-related processes and procedures; (5) is designed to ensure adequate venting flow-rates needed to make certain all trapped gas are expelled during the venting process; (6) allows for convenient and fast connection and disconnection of user venting rigs and equipment; and (7) is favorable to government regulators because it allows for passive monitoring (no electricity or wires) and thus has fewer modes of failure.

Device 10 may in an exemplary embodiment be about 30 inches tall from the bottom of pipe fitting 16 to the top of tube plug 86. Magnetic float 22 may be about 6 inches in length. The inside diameters of the pipe stub 42 and standpipe 18 may be about 2 inches. Valve exit pipe 74 may be about 1 inch long with an inside diameter of about 0.6 inch. Tube 76 may be about 2 inches long with an inside diameter of about 0.4 inch.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A device for use with a system pipe, said system pipe having a hole formed therein, said device comprising:
   (a) a pipe fitting attached to a system pipe with a hole formed therein, said pipe fitting positioned over said hole of said system pipe and in fluid communication with said system pipe;
   (b) a standpipe attached to and in fluid communication with said pipe fitting and said system pipe;
   (c) a magnetic float carried within said standpipe, said magnetic float being freely movable in said standpipe so that, when fluid or gas flow from said system pipe through said hole into said pipe fitting and into said standpipe, said magnetic float floats vertically with the level of said fluid;
   (d) a vent valve attached to said standpipe and in fluid communication with said standpipe for venting gas entering said standpipe with said fluid; and
   (e) an indicator exterior to said standpipe and responsive to movement of said magnetic float vertically within said standpipe to thereby indicate the level of said fluid in said standpipe.

2. The device as recited in claim 1, further comprising a scale affixed to said standpipe and having a sequence of numbers thereon, said indicator being proximate to said scale so that said indicator corresponds to a number of said sequence of numbers on said scale.

3. The device as recited in claim 1, further comprising a quick-disconnect fitting attached to said vent valve to facilitate receiving vented gas.

4. The device as recited in claim 1, wherein said pipe fitting has a flange and said standpipe has a flange and wherein said device further comprises:
   (f) float retaining orifice positioned between said flange of said pipe fitting and said flange of said standpipe;
   (g) a lower gasket;
   (h) an upper gasket; and
   (i) means for securing together said flange of said pipe fitting and said flange of said standpipe with said float retaining orifice and said lower and said upper gasket there between.

5. The device as recited in claim 4, wherein said float retaining orifice has grooves formed on opposing faces thereof so that said lower gasket and said upper gasket are pressed into said grooves to seal against said float retaining orifice when said flange of said pipe fitting and said flange of said standpipe are secured together by said securing means.

6. The device as recited in claim 4, wherein said float retaining orifice has a central hole and plural lateral flow holes for said fluid to flow through said float retaining orifice, said central hole being smaller than said magnetic float so that said magnetic float is stopped by said float retaining orifice but said fluid is not.

7. The device as recited in claim 1, further comprising:
   (a) a pipe cap carried by said standpipe between said standpipe and said valve; and
   (b) an upper float stop positioned within said standpipe below said pipe cap, said upper float stop having plural flow holes formed therein to permit fluid to flow from said standpipe through said pipe cap to said vent valve.

8. The device as recited in claim 7, wherein said upper float stop has a rim and counter-bore to stand said flow holes away from said pipe cap.

9. The device as recited in claim 1, further comprising means for operating said vent valve remotely.

10. The device as recited in claim 1, further comprising a scale remote from said standpipe and wherein said indicator is carried by said scale.

11. A device for use with a system pipe, said system pipe having a hole formed therein, said device comprising:
   (a) a standpipe attached to and in fluid communication with a system pipe, said system pipe having a hole formed therein so that fluid or gas flow from said system pipe through said hole into said standpipe;
   (b) a magnetic float carried within said standpipe, said magnetic float floatable in fluid and freely movable vertically in said standpipe with the level of fluid in said standpipe when said fluid flows from said system pipe into said standpipe;
   (c) a vent valve attached to said standpipe and in fluid communication with said standpipe for venting gas from said standpipe; and
   (d) an indicator exterior to said standpipe and responsive to movement of said magnetic float within said standpipe to thereby indicate the level of said fluid in said standpipe.

12. The device as recited in claim 11, further comprising a scale exterior to said standpipe, said scale carrying a sequence of numbers, said indicator carried by said scale thereby adjacent to a number of said sequence of numbers on said scale.

13. The device as recited in claim 11, further comprising a quick-disconnect fitting attached to said vent valve for facilitating receipt of vented gas from said standpipe.

14. The device as recited in claim 11, further comprising a float retaining orifice and an upper float stop for limiting travel of said magnetic float within said standpipe, said float retaining orifice and said upper float stop each having plural flow holes formed therein to permit fluid flow there through.

15. The device as recited in claim 11, further comprising means for operating said vent valve remotely.

16. A device for use with a system pipe, said system pipe having a hole formed therein, said device comprising:
   (a) a pipe fitting attached to and in fluid communication with a system pipe, said system pipe having a hole formed therein, said pipe fitting being attached to said system pipe over said hole, said pipe fitting having a flange;
   (b) a stand pipe having a flange;
   (c) a magnetic float carried within said standpipe above said flange of said standpipe, said magnetic float floatable in fluid and moving vertically in said standpipe with the level of said fluid when said fluids or gas flow from said system pipe through said hole and said pipe fitting and into said standpipe;
   (d) a float retaining orifice positioned between said flange of said pipe fitting and said flange of said stand pipe, said float retaining orifice having plural flow holes formed therein through which fluid passes when fluid flows from said system pipe, through said hole, through said pipe fitting and into said standpipe;
   (e) gaskets positioned above and below said float retaining orifice;
   (f) releasable means for securing said flange of said pipe fitting to said flange of said standpipe with said gaskets and said flow retaining orifice there between;
   (g) an upper float stop carried within said standpipe above said magnetic float, said upper float stop limiting upward flotation of said magnetic float, said float retaining orifice limiting downward flotation of said magnetic float, said upper float stop having flow holes formed therein;
   (h) a vent valve attached to said standpipe above said upper float stop and in fluid communication with said standpipe for venting gas from said standpipe when said gas flows from said system pipe, through said hole, into said pipe fitting and into said standpipe;
   (i) an indicator located exterior to said standpipe and responsive to movement of said magnetic float within said standpipe to thereby indicate the level of said fluid in said standpipe; and
   (j) a numerical scale carried by said standpipe and carrying said indicator for indicating numerically said fluid in said standpipe.

17. The device of claim 16, further comprising a low level sensor; a high level sensor and an electrical control switch in operative connection with said low and said high level sensors and in electrical connection with said electrical control switch, said vent valve being an electrical valve responsive to said electrical control switch so that, when said low level sensor senses said fluid level in said standpipe has fallen below a low pre-selected level, said electrical control switch opens said vent valve, and when said high level sensor senses that said fluid level in said standpipe has risen above a high pre-selected level, said electrical control switch closes said vent valve.

* * * * *